(12) United States Patent
Takahashi et al.

(10) Patent No.: US 11,120,297 B2
(45) Date of Patent: Sep. 14, 2021

(54) SEGMENTATION OF TARGET AREAS IN IMAGES

(71) Applicant: International Business Machines Corporation, Armonk, NY (US)

(72) Inventors: Koichi Takahashi, Edogawa (JP); Hiroki Nakano, Otsu (JP); Masahiro Okawa, Kashiwa (JP)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 16/205,752

(22) Filed: Nov. 30, 2018

(65) Prior Publication Data

US 2020/0175324 A1    Jun. 4, 2020

(51) Int. Cl.
*G06K 9/62*  (2006.01)
*G06T 7/11*  (2017.01)
*G06T 7/13*  (2017.01)

(52) U.S. Cl.
CPC ......... *G06K 9/6228* (2013.01); *G06K 9/6202* (2013.01); *G06K 9/6257* (2013.01); *G06K 9/6267* (2013.01); *G06T 7/11* (2017.01); *G06K 9/6262* (2013.01); *G06T 7/13* (2017.01); *G06T 2207/10116* (2013.01); *G06T 2207/20076* (2013.01); *G06T 2207/20081* (2013.01); *G06T 2207/20084* (2013.01); *G06T 2207/20212* (2013.01); *G06T 2207/30061* (2013.01)

(58) Field of Classification Search
CPC .. G06K 9/6228; G06K 9/6202; G06K 9/6267; G06K 9/6257; G06K 9/6262; G06T 7/11; G06T 7/13; G06T 2207/20212; G06T 2207/20076; G06T 2207/30061; G06T 2207/20084; G06T 2207/20081; G06T 2207/10116
See application file for complete search history.

(56) References Cited

U.S. PATENT DOCUMENTS

| 10,733,756 | B2* | 8/2020 | Choi | G06T 7/73 |
| 2007/0160286 | A1* | 7/2007 | Haque | G06K 9/38 382/164 |
| 2009/0003699 | A1* | 1/2009 | Dugan | G06K 9/6263 382/173 |
| 2009/0304271 | A1* | 12/2009 | Takahashi | G06T 7/11 382/165 |
| 2014/0193074 | A1* | 7/2014 | Huang | G06K 9/4676 382/180 |
| 2017/0156157 | A1* | 6/2017 | Zhang | H04W 72/1278 |
| 2017/0294014 | A1 | 10/2017 | Nakano | |

(Continued)

FOREIGN PATENT DOCUMENTS

CN    104899926 B    5/2018
JP    2018060511 A    4/2018

(Continued)

*Primary Examiner* — Christopher M Brandt
(74) *Attorney, Agent, or Firm* — Brian D. Welle

(57) ABSTRACT

An input image that includes a target area may be received. A first segment for extracting the target area from the input image may be generated using a first extracting model. A second segment for extracting the target area from the input image may be generated using a second extracting model. The first segment is compared to the second segment to determine a combined segment of at least the target area.

25 Claims, 11 Drawing Sheets

(56) References Cited

U.S. PATENT DOCUMENTS

| | | | |
|---|---|---|---|
| 2018/0068446 A1 | 3/2018 | Ross | |
| 2019/0080456 A1* | 3/2019 | Song | ............... G06T 7/12 |
| 2020/0160173 A1* | 5/2020 | Pandey | ............ G06N 3/0454 |

FOREIGN PATENT DOCUMENTS

| | | |
|---|---|---|
| WO | 2017171005 A1 | 10/2017 |
| WO | 2017207138 A1 | 12/2017 |

* cited by examiner

SEGMENTATION OF TARGET AREAS IN IMAGES

BACKGROUND

Image classification or identification is used in a variety of technical fields. For example, the medical field may utilize imagine classification or identification. Specifically, systems in the medical field may be configured to analyze generated or received images to attempt to gather additional information from the images. For example, systems may be configured to analyze images in order to classify images as either including or not including visual indication of a disease or a medical condition.

SUMMARY

Aspects of the present disclosure relate to segmentation of images. More specific aspects of the present disclosure relate to a method for segmentation of a target area in an input image. One aspect of the present disclosure relates to a computer-implemented method that includes receiving an input image that includes a target area. The method may further include generating, using a first extracting model, a first segment for extracting the target area from the input image. The method may further include generating, using a second extracting model, a second segment for extracting the target area from the input image. The method may further include comparing the first segment to the second segment to determine a combined segment of at least the target area.

The computer-implemented method may include extracting a target area from the input image using the combined segment and classifying the input image based on the target area extracted from the input image. In this way, input images may be classified or identified by extracting accurate target areas from input images based on the combined segment. The comparing may include determining a value of each pixel in the combined segment based on values of corresponding pixels in the first and second segments via majority rule. By using majority rule for each pixel, pixels may be included in the target area even when a minority of the extracting models incorrectly excluded such pixels from the target area.

The comparing may include generating the combined segment using a combining model, and the combining model inputs the first and second segments and outputs the combined segment. By using a combining model, the accuracy of the combined segment may be further improved. The computer-implemented method may include training the combining model based on at least one first training dataset, wherein each first training dataset includes a plurality of training segments and a training combined segment. By using a machine learning model as the combining model, the accuracy of the combined segment may be further improved. The combining model may include a neural network. By using a neural network, the accuracy of the combined segment may be improved through training the neural network.

The computer-implemented method may include training the first and second extracting models based on training datasets, wherein each training dataset includes a training input image and a training segment. In this way, the accuracy of each extracting model may be improved to achieve higher accuracy of the combined segment. Further, the first and second extracting models may be trained by training each extracting model using a K-fold cross-validation method. In this way, each extracting model may be trained differently from other extracting models, introducing a robust resiliency into the method.

Also provided is a computer program product including one or more computer readable storage mediums collectively storing program instructions that, when executed by a processor or programmable circuitry, cause the processor or programmable circuitry to perform operations including: generating, using a first extracting model, a first segment for extracting the target area from the input image; generating, using a second extracting model, a second segment for extracting the target area from the input image; and comparing the first segment to the second segment to determine a combined segment of at least the target area.

Also provided is an system including a processor or a programmable circuitry, and one or more computer readable mediums collectively including instructions that, when executed by the processor or the programmable circuitry, cause the processor or the programmable circuitry to: generate, using a first extracting model, a first segment for extracting the target area from the input image; generate, using a second extracting model, a second segment for extracting the target area from the input image; and compare the first segment to the second segment to determine a combined segment of at least the target area The summary clause does not necessarily describe all necessary features of the embodiments of the present disclosure. The present disclosure may also be a sub-combination of the features described above.

DETAILED DESCRIPTION

Figure 1:
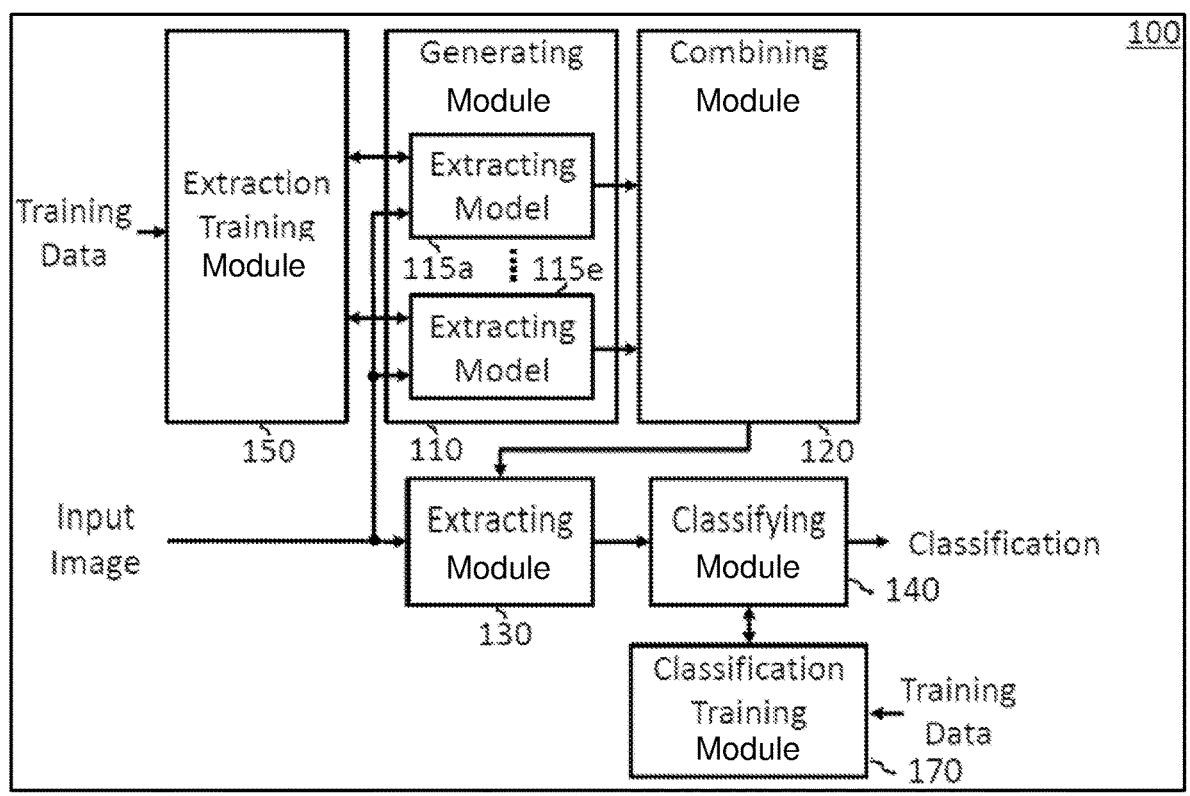
FIG. 1 depicts a conceptual and schematic illustration of an example system configured to manage a plurality of segments.

Hereinafter, aspects of the present disclosure are described, such as aspects related to managing and analyzing images. For example, a system may classify images and/or identify portions of images that indicate or otherwise include some manner of data. When classifying and/or identifying images, it may be desirable to classify or identify data from one or more input images based on information in a target area. For example, where one or more received images are being classified or identified in a medical context, such a target area may include and/or depict an organ as captured in the received images (said received images referred to hereinafter as input images). It may be beneficial or necessary to extract the proper target area in the input images prior to classifying the input image (rather than attempt to classify data from a non-target area of the input images).

In some examples, a system may segment the input images. Segmentation may include partitioning some or all of the input images into a plurality of segments (e.g., where each segment includes a group of pixels, otherwise stated as each segment being a "super-pixel"). Once segmented, the system may identify the target areas. The system may identify the proper target area by identifying a contour (e.g., an outer perimeter or other identifying feature) that is associated with the target area. In certain examples, it may be difficult or impossible to identify one or more contours of a target area for a respective input image by segmenting a single image using an extraction model (a model configured to identify the target area and therein create a segment that incorporates the target area). For example, where the input image is an X-ray of a non-human animal and the target area is the lung (e.g., in an application to detect lung disease of animals) even after segmentation of the input image using a well-tailored extraction model it may be difficult or impossible to identify a requisite number or amount of contours of the lung (e.g., due to chest X-rays region of some animals being relatively more "cluttered" compared to human chest X-rays). As such, in order to identify a target area for classification, it may be necessary to compare a plurality of input images. For example, to continue the animal lung X-ray example above, a first input image may include a 'dorsal-ventral' (i.e., taken from the back of the animal) X-ray image and a second input image may include a lateral (i.e. taken from the side of the animal) X-ray image, which together may be used to piece together a representative target area.

Aspects of this disclosure relate to using a plurality of unique extracting models that are each configured to segment at least the target area of an input image. Once each extracting model thusly segments the input image, corresponding pixels of each of the segments of each of the extracting models may be compared. A system may identify a combined segment that functionally averages out pixels from each segment created by each extracting model. In this way, aspects of this disclosure may utilize a plurality of unique extracting models to identify a pixelized depiction of a target area from a single input image that may be relatively more accurate and representative of the target area than could be otherwise gathered from a single input image. Further, as a result of the plurality of extracting models being used to create a relatively accurate combined segment of the target area, it may be easier (or possible where it was previously impossible) to accurately identify contours of the target area of the combined segment with which the input image may be classified.

FIG. 1 shows an example system 100 that is configured to receive one or more input images and then classify or identify one or more portions of those input images. In some examples, system 100 may be configured to generate a probability that the input image is associated with (e.g., is accurately categorized as belonging to) one or more predetermined classes. System 100 may execute this functionality with a plurality of modules as described below. Modules may execute this functionality through a combination of hardware and software. Modules may include or otherwise utilize processing circuits (e.g., otherwise referred to as processors herein) to execute instructions to execute the functionality ascribed to the modules. In some examples, each module may include respective processing circuitry, whereas in other examples modules may share one or more common processors.

In some examples, system 100 may be configured to obtain or otherwise receive an image, such as an X-ray image of an organ. For example, system 100 may receive a 'dorsal-ventral' or lateral X-ray image of a chest of an animal, and output (e.g., generate) a probability of a presence of diseases in the lung area. In other embodiments, system 100 may be used for categorizing input images in other types of classes (e.g., detecting a defect of products, or biometric security recognition, or the like).

System 100 may include generating module 110 and combining module 120. Generating module 110 may be configured to receive one or more input images and generate a plurality of segments ("segments" hereinafter being interchangeably referred to and referable herein as "segmentation images") for each of the input images. Generating module 110 may generate each segment via a respective extracting model of a plurality of extracting models. Each extracting model may define a different algorithm or structure of generating a segment, such that when executed each extracting model includes a different series of operations that may result in the generation of a relatively unique segment. Each segment may include a plurality of pixels, and in some examples each segment of the plurality may include a different plurality of pixels when compared to other segments of the plurality (e.g., as a result of the relatively unique extracting models). Generating module 110 may generate a plurality of segments so that system 100 may extract (e.g., identify and analyze) one or more target areas of the input images. For example, to continue the medical example discussed above, generating module 110 may be configured to distinguish an image area corresponding to an organ of interest from other areas in the input image.

In some examples, a pixelated image (e.g. the input image after segmentation) may include a two-dimensional array of pixels (x, y) (x=0, 1, ..., $SIZE_x$-1 and y=0, 1, ..., $SIZE_y$-1). In other implementations, pixelated images may be three-dimensional arrays of pixels. Generating module 110 may further generate a mask image that distinguishes the target area of the input image from irrelevant areas of the input image. For example, the mask image may include pixels that each define a pixel value based on an estimated probability (e.g. 0.8 if the probability is 80%) that the pixel is in the target area (e.g. lung area). In another example, the mask image may define pixels in the target area to have relatively larger pixel values (e.g. 1, $2^8$-1, $2^{16}$-1, or 1.0) and define pixels outside of the target area to have relatively smaller pixel values (e.g. 0 or 0.0).

Generating module 110 may include a plurality of extracting models 115a to 115e, which may be individually or collectively referred to as extracting model(s) 115. Generating module 110 may be configured to generate the plurality of segments using the plurality of extracting models 115a to 115e. Once generating module 110 generates the plurality of segments, generating module 110 may transmit the plurality of segments to the combining module 120 or otherwise cause the combining module 120 to receive or retrieve the plurality of segments.

Combining module 120 may be configured to compare some of the plurality of segments to create a combined segment once the plurality of segments is received/retrieved. The combined segment may be more "accurate" (e.g., indicative of the actual object which the combined segment is depicting) than some or all of the plurality of segments. Instead of just selecting one entire segment from the plurality of segments generated by generating module 110, combining module 120 compares and then modifies and/or merges pixels of the plurality of segments. For example, combining module 120 may create the combined segment such that values of some pixels in the combined segment may be based on a segment from a first extracting model, while values of some other pixels in the combined segment may be based on a segment from a second extracting model that is different from the first extracting model. Alternatively, or additionally, combining module 120 may create the combined segment such that the values of some pixels or individual pixels in the combined segment is calculated based on at least two segments of the plurality of segments, and the combined segment as a whole is calculated based on the plurality of segments.

System 100 may further include extracting module 130 and classifying module 140. Combining module 120 may transmit the combined segment and input image to extracting module 130, or otherwise cause extracting module 130 to receive or retrieve the input image and the combined segment. Extracting module 130 may be configured to extract a target area from the input image using the combined segment. For example, extracting module 130 may be configured to "mask out" (e.g., remove or otherwise filter out) irrelevant areas in the input image. Additionally, or alternatively, extracting module 130 may be configured to reduce the value of pixels outside of the target areas in the input image. Additionally, or alternatively, extracting module 130 may be configured to maintain values of pixels within the target area in the input image. Extracting module 130 may generate or output an extracted input image. Extracting module 130 may transmit the extracted input image to classifying module 140, or otherwise cause classifying module 140 to receive the extracted input image.

Classifying module 140 may be configured to classify or identify the input image based on the target area extracted from the input image. In some examples, classifying module 140 may include a classification model that classifies the input image based on the extracted input image. For example, classifying module 140 may be configured to generate or output a probability or a mathematical certainty of the presence or the absence of a predetermined object in the input image. To continue the medical example above, classifying module 140 may generate or output a probability or a certainty of the presence or the absence of a predetermined disease within an organ in the X-ray image of the organ. For example, classifying module 140 may generate or output a probability or certainty of the presence of pneumonia or a nodule in the lung of an animal.

In some examples, extracting module 130 and classifying module 140 may be housed within a different classifying system for classifying an input image using a combined segment generated by system 100 based on the input image. For example, modules of system 100 may utilize separate processing or memory components than the classifying system. In this case, generating module 110 and combining module 120 of system 100 may be configured to generate the combined segment and combining module 120 of system 100 may be configured to transmit the combined segment to the classifying system.

System 100 may include extracting training module 150. Extracting training module 150 may receive or otherwise have access to one or more training datasets for training extracting models 115. In some examples, each training dataset may include a training input image and a training segment. An example of a training dataset will be explained in reference to the following FIG. 3. Extracting training module 150 may be configured to train the plurality of extracting models 115 based on the training datasets. In other examples, extracting training module 150 may be housed within a different extraction training system for training extracting models 115. In this case, system 100 receives trained model parameters of extracting models 115 from the extraction training system and generates combined segments using the extracting models 115 including the trained model parameters.

System 100 may include classification training module 170. Classification training module 170 may receive or otherwise have access to one or more training datasets for training a classification model in classifying module 140. In some examples, each training dataset may include a training input image and a training classification result. Classification training module 170 may transmit the training input image to generating module 110 and extracting module 130. Further, classification training module 170 may obtain the extracted input image from extracting module 130. Classification training module 170 may be configured to train the classification model in classifying module 140 using the extracted input image of the training input image and the training classification result. In other examples, classification training module 170 may be housed within a different classification training system for training the classification model in classifying module 140. In this case, system 100 may receive trained model parameters of the classification model from the classification training apparatus and classifies input images using the classification model including the trained model parameters.

In some examples, system 100 may generate two or more segments using two or more different extracting models 115a to 115e, and compare these segments to obtain a combined segment. Therefore, even when some of extracting models 115 are not sufficiently accurate enough to generate "correct" segments (e.g., segments that accurately depict the physical nature that the segments are rendering) of certain input images, system 100 may have an improved ability to generate accurate combined segments for such input images. Therefore, system 100 may improve the accuracy of the classification of the input image.

Figure 2:
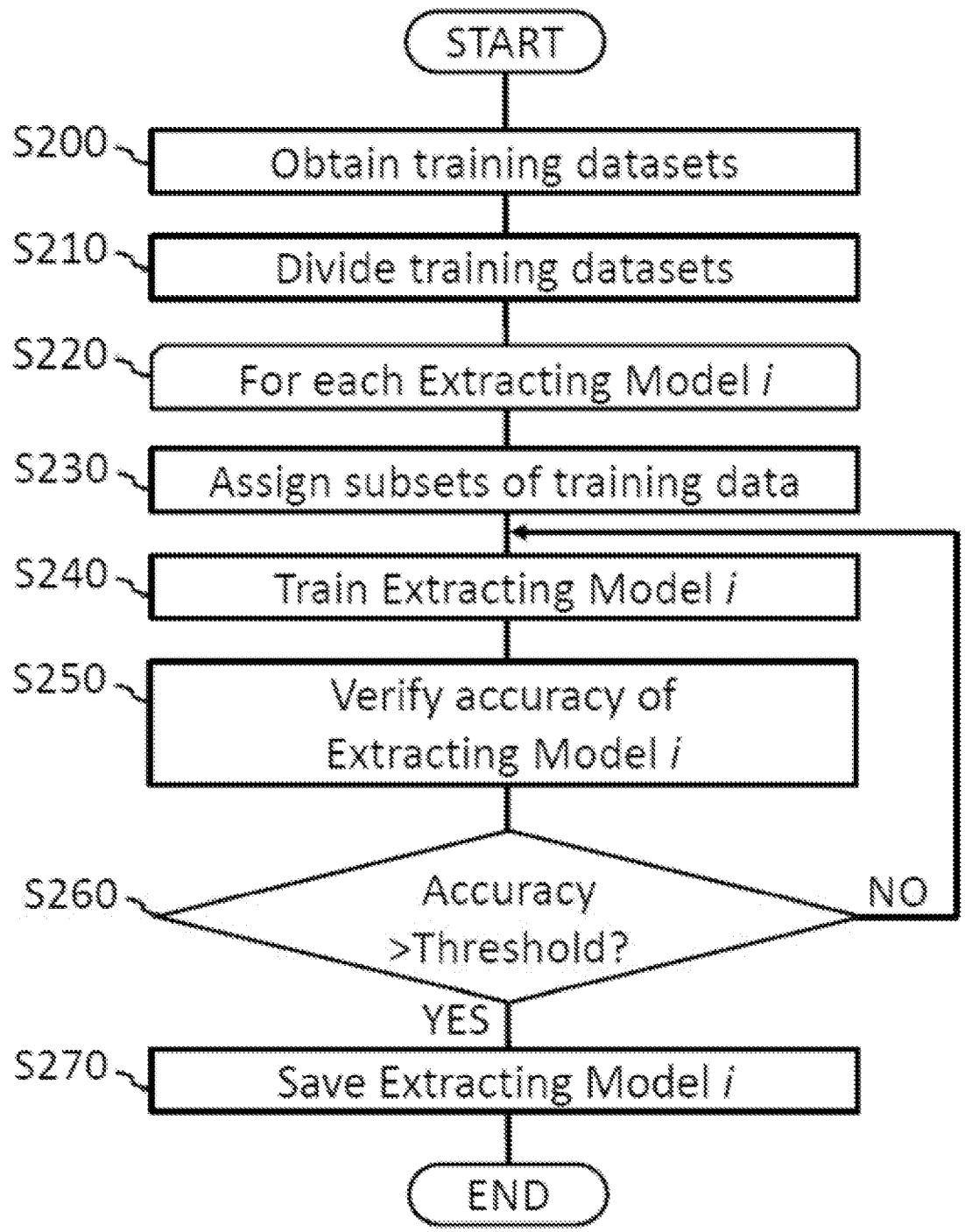
FIG. 2 depicts a flowchart of an example method of for training model extraction.

FIG. 2 depicts a flowchart of an example method of training extracting models. The operations of this figure may be performed by, for example, system 100 and its components that were explained in reference to FIG. 1. While the operational flow of this figure will be explained in reference to system 100 and its components, the operational flow may be performed by other systems having different components as well. Further, in some examples system 200 may execute other methods of training extracting models that are consistent with this disclosure (e.g., including additional steps or less steps or similar steps in a different order).

Extracting training module 150 may obtain (e.g., receive from a source or gather from a source) training datasets for training extracting models 115 (S200). For example, extracting training module 150 may obtain N training datasets where N is a positive integer. N training datasets may be all training datasets that are available/accessible to extracting training module 150. Extracting training module 150 may divide N training datasets into a plurality of subsets (S210).

Subsequent to dividing the training datasets into subsets, training module 150 may execute one or more cycles of operations (e.g., steps S230 to S270) until training module 150 determines that each model of extracting models 115a to 115e (where a single model of extracting models 115a to 115e is referred to herein as model i) is trained accurately as described below.

Extracting training module 150 may assign one or more different combinations of subsets from the plurality of subsets for training and validating each extracting model i (S230). Extracting training module 150 may assign training datasets for training each extracting model i, which each training dataset is at least partially different from training datasets for training other extracting models. Extracting training module 150 may assign one or more training datasets to each extracting model. In this way, extracting training module 150 may execute a cross-validation that uses some of the assigned training datasets for training extracting model i, therein using remaining training datasets of the assigned datasets for validating extracting model i.

In some examples, extracting training module 150 may also assign training datasets for validating each extracting model i. In such examples, extracting training module 150 may assign training datasets for validation such that each assigned training dataset is at least partially different from training datasets assigned for the purpose of validating other extracting models. In some examples, only one of the training datasets for training or training datasets for validating is at least partially different from corresponding training datasets for training or validating any one of other extracting models. Further discussion of dividing training datasets and assigning subsets of training data is discussed below in regards to FIG. 4.

Extracting training module 150 may train each extracting model i using the assigned training datasets for training the extracting model i (S240). In some examples, each extracting model of the plurality of extracting models 115a to 115e is a machine learning model that may convert an input image into a pixelated image. Each extracting model 115 may include a structure or an algorithm of a machine learning model and model parameters associated therewith. Before extracting training module 150 starts training each extracting model 115, extracting training module 150 may initialize model parameters of the extracting model 115. Initializing model parameters may include assigning fixed values or random values as initial parameters for each extracting model. Extracting training module 150 may assign identical or different initial model parameters to each of extracting models 115.

In some examples, each extracting model is, or includes, a neural network such as a convolutional neural network (CNN) or U-Net. Extracting training module 150 may update weights and/or bias parameters of the neural network using the assigned training datasets for training with one or more training methods. For example, extracting training module 150 may update weights and/or bias parameters using a backpropagation training method.

Extracting training module 150 may verify the accuracy of the extracting model i (S250). In order to verify accuracy, extracting training module 150 may input each training input image in the assigned training datasets (for validating to the extracting model i), and therein obtain each segment output from the extracting model i. Once segments outputs are obtained, extracting training module 150 may compare each segment with a corresponding training segment in the assigned training datasets for validation. Extracting training module 150 may be configured to calculate an accuracy (e.g. an average or minimum accuracy for the assigned training datasets that reflects an amount which the obtained segment(s) match the training segment(s)) based on the comparison results relating to each assigned training dataset for validating.

Extracting training module 150 may determine if the accuracy is larger than a threshold (S260) for a respective extracting model i. If extracting training module 150 determines that accuracy of the extracting model i is below the threshold, then extracting training module 150 executes another cycle of training (S240) and verifying an accuracy (S250) of the respective extracting model i. If extracting training module 150 determines that the accuracy is larger than a threshold, then extracting training module 150 finishes training the extracting model i, and saves the parameters of the extracting model i in memory or storage (S270). In this way, extracting training module 150 may repeat training the extracting model i until an improvement or an increase of the accuracy is obtained to a predetermined accuracy level. In some examples, extracting training module 150 may be configured to only attempt a predetermined number of training cycles (e.g., S240-S260) before terminating the training cycle for the respective extracting model i and discarding or otherwise not utilizing the respective extracting model i. By executing this training cycle for each extracting model i, the plurality of extracting models 115 are trained to generate segments for input images.

In this way, the algorithm structures of the extracting models 115a to 115e may be substantially similar even as each of extracting models 115a to 115e is trained differently using different training datasets. For example, the network structure of the CNN in the extracting models 115a to 115e may be identical, while each CNN of each extracting model is trained differently using the assigned training datasets that are different from the assigned training datasets for other extracting models. In other examples, the structures or algorithms of the extracting models 115a to 115e may be different. In such examples, extracting training module 150 may assign the same or different training datasets to each extracting model 115.

In other examples, extracting training module 150 may train one extracting model 115 using the training datasets, and during the course of the training one or more extracting models 115 may be "realized" (e.g., fully trained) at different timings when different amounts of training have been performed. In other words, extracting training module 150 trains and saves a first extracting model 115a in the plurality of extracting models 115, and then extracting training module 150 trains a second extracting model 115b which is further trained from the first extracting model 115a using the same or different training datasets.

For example, extracting training module 150 may repeat the training cycle of FIG. 2 for 10,000 times to obtain a first extracting model 115a, and by starting from the model parameters copied from the trained first extracting model 115b, extracting training module 150 further repeats the training cycle for 1,000 more times to obtain a second extracting model 115b, and so on to obtain the plurality of extracting models 115 each of which are obtained at different timings when different amount of training has performed. In this case, some part of training may be applied to two or more extracting models 115 and therefore the total training time may be decreased. Furthermore, some of the extracting models such as extracting model 115e may be well trained and may have higher accuracy for input images similar to the training input images while the other extracting models such as extracting model 115a may be useful for avoiding the overfitting effect.

Figure 3:
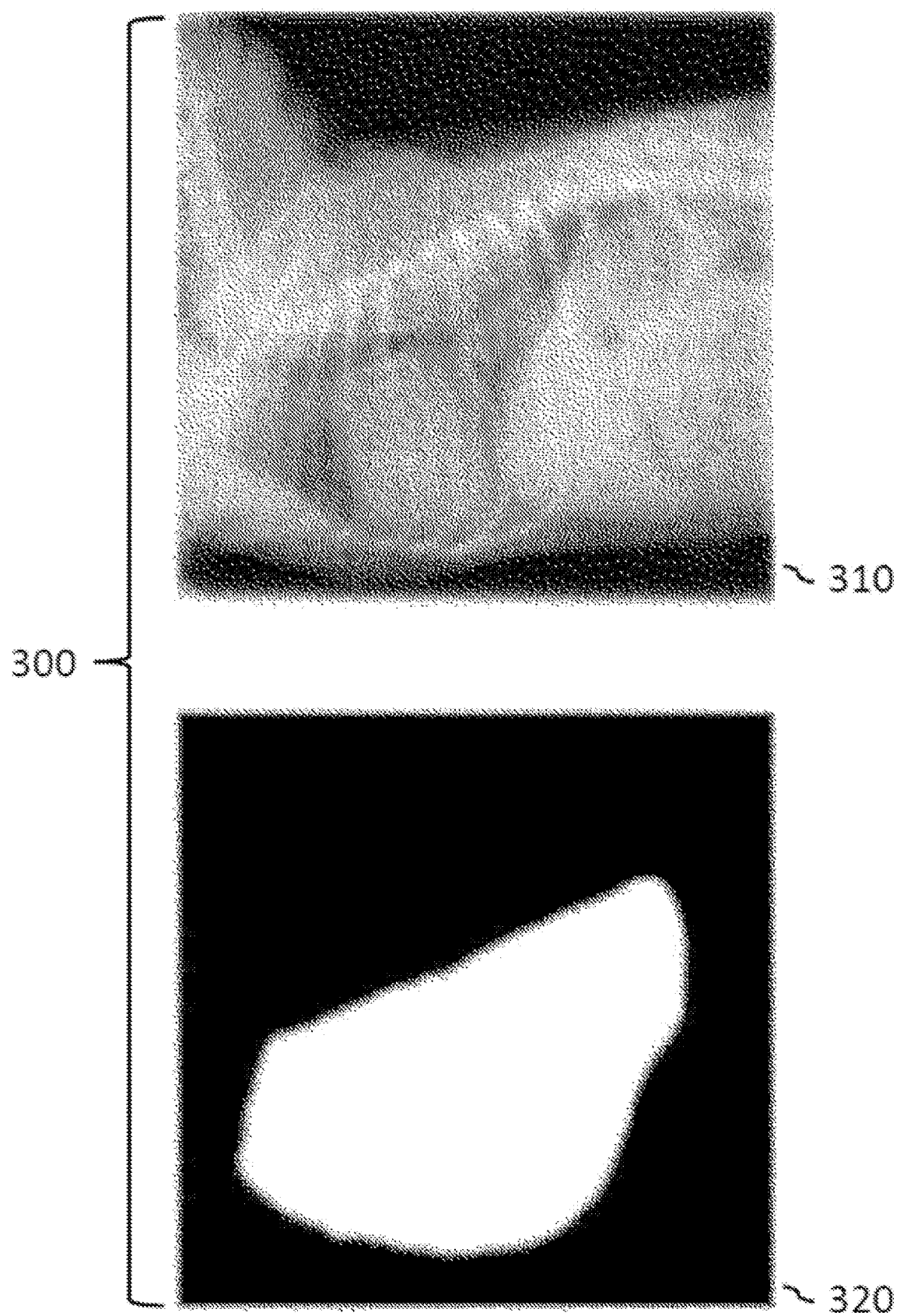
FIG. 3 depicts an example training dataset for training extraction models.

FIG. 3 depicts an example training dataset 300 for training extracting models according. Training dataset 300 includes training input image 310 and training portion 320. As depicted, training input image 310 is a lateral X-ray image around a chest of an animal, while training portion 320 is created by a professional such as a veterinarian. In this example, training portion 320 has a pixel value of 1 for pixels within the lung area in training input image 310, and a pixel value of 0 for pixels outside of the lung area in training input image 310. Extracting training module 150 receives a plurality of training datasets 300, and uses them to train extracting models 115a-e.

Figure 4:
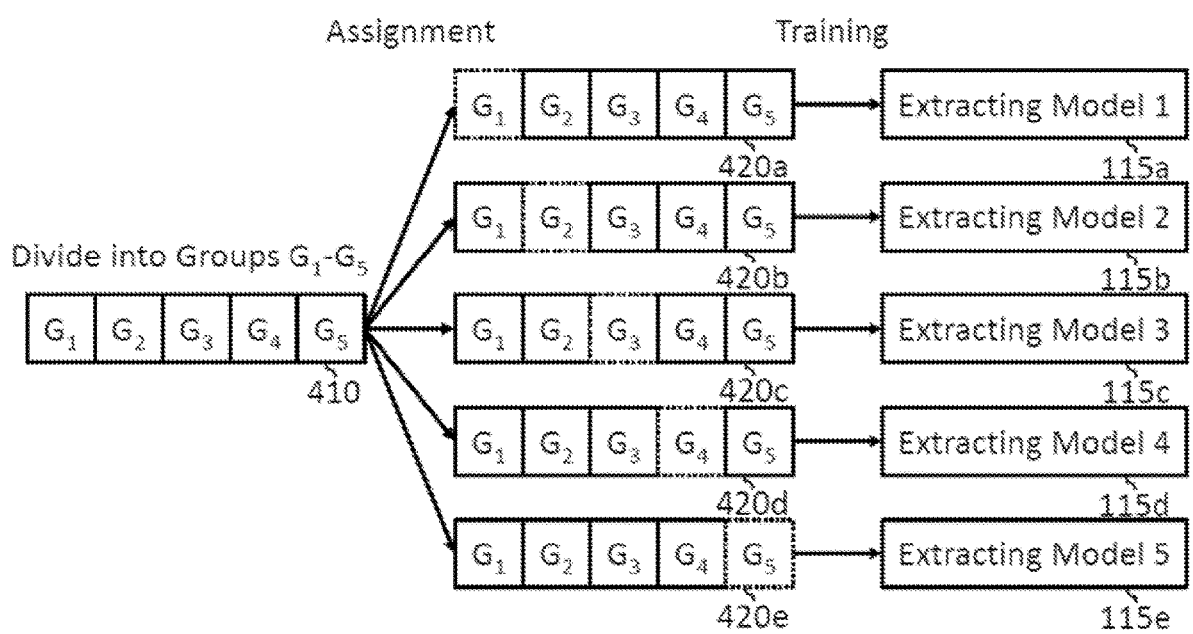
FIG. 4 depicts a conceptual data flow of training model extraction.

FIG. 4 depicts a conceptual data flow of training extracting models. Extracting training module 150 may receive training datasets 410 that include N training datasets, such as training dataset 300 of FIG. 3 (e.g., as at S200 of FIG. 2). Extracting training module 150 may divide N training datasets into a plurality of subsets (e.g., as at S210 of FIG. 2). In the example of FIG. 4, generating module 110 has five extracting models 115 and training datasets 410 is divided into five subsets or groups $G_1$ to $G_5$, though more or less extracting models 115 and/or training datasets 410 may be utilized in other examples.

Extracting training module 150 may assign a different combination of subsets for training and validating each extracting model 115. As depicted in FIG. 4, extracting training module 150 may assign training datasets 420a including group $G_1$ as training datasets for validation and groups $G_2$ to $G_5$ as training datasets for training to extracting model 115a. Similarly, extracting training module 150 may assign training datasets 420a including group $G_2$ as training datasets for validation and groups $G_1$ and $G_3$ to $G_5$ as training datasets for training to extracting model 115b, training datasets 420c including group $G_3$ as training datasets for validation and groups $G_1$, $G_2$, $G_4$ and $G_5$ as training datasets for training to extracting model 115c, training datasets 420d including group $G_4$ as training datasets for validation and groups $G_1$ to $G_3$ and $G_5$ as training datasets for training to extracting model 115d, and training datasets 420e including group $G_5$ as training datasets for validation and groups $G_1$ to $G_4$ as training datasets for training to extracting model 115e.

Extracting training module 150 may train each extracting model 115 by, e.g., using a K-fold cross-validation method (e.g., at S240 of FIG. 2). For example, extracting training module 150 may train extracting models 115 using a K-fold cross-validation method where K is 5. In such examples, N training datasets may be divided into K=5 groups $G_1$ to $G_5$, where each extracting model 115 has a different assignment of a group for validating the extracting model 115. By using a K-fold cross-validation method, extracting training module 150 may use the training datasets effectively to train the plurality of extracting models 115.

Figure 5:
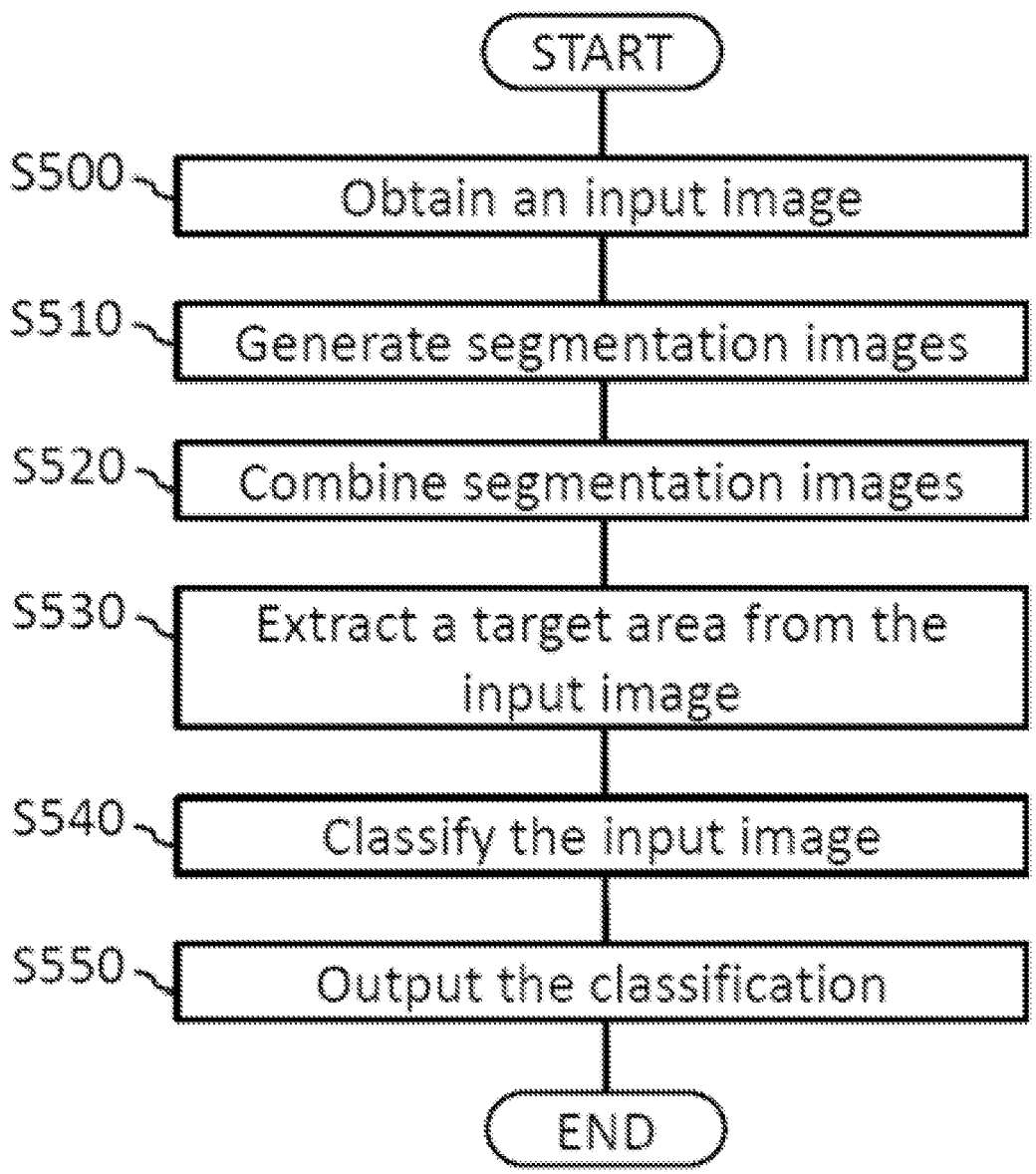
FIG. 5 depicts a flowchart of an example method of classifying an input image.

FIG. 5 depicts a flowchart of an example method of classifying or categorizing an input image. The operations of this figure may be performed by, for example, system 100 and its components that were explained in reference to FIG. 1. While the operational flow of this figure will be explained in reference to system 100 and its components, the operational flow may be performed by other apparatus having different components as well. Further, in some examples system 100 may execute other methods of classifying or categorizing an input image that are consistent with this disclosure (e.g., including additional steps or less steps or similar steps in a different order). The operational flow of FIG. 5 is performed to examine an input image of interest after training the plurality of extracting models 115a to 115e and training the classification model in classifying module 140. A method of training the classification model is described in greater detail below in reference to FIG. 7.

As described above, system 100 may obtain an input image of interest (S500). System 100 may be sent the input image or system 100 may retrieve the input image from a source that is available to system 100. Generating module 110 may receive the input image and generate a plurality of segments for extracting a target area in the input image using the plurality of extracting models 115a to 115e (S510). Once generating module 110 generates the plurality of segments, combining module 120 may compare some or all of the plurality of segments to obtain a combined segment (S520). Combining segments is described in greater detail below with reference to FIG. 6.

Extracting module 130 may extract a target area from the input image using the combined segment (S530). In some examples, extracting module 130 may mask the pixel value of each pixel in the input image based on the pixel value of corresponding pixel in the combined segment. For example, extracting module 130 may generate an extracted input image that has pixel values that are substantially similar to the pixel values of corresponding pixels in the input image if pixel values of corresponding pixels in the combined segment are, e.g., 1 (unmask). Similarly, extracting model 130 may set pixel values of, e.g., 0, if pixel values of corresponding pixels in the combined segment are 0 (mask). In other examples, extracting module 130 may calculate pixel value $P_{ex}$ (x, y) of pixel (x, y) in the extracted input image based on pixel value $P_{in}$(x, y) of pixel (x, y) in the input image and pixel value $P_s$(x, y) of pixel (x, y) in the combined segment by, e.g., multiplying $P_{in}$(x, y) with $P_s$(x, y) (i.e. $P_{ex}$(x, y)=$P_{in}$(x, y)×$P_s$(x, y)). Classifying module 140 may receive the extracted input image and classify or identify the input image as indicating a thing or belonging to a category based on the target area extracted from the input image (S540). Once classified, classifying module 140 may output a classification of the input image (S550). For example, classifying module 140 may cause a display to display one or more images that indicate the classification, or classifying module 140 may cause a speaker to create a noise that indicates the classification.

Figure 6:
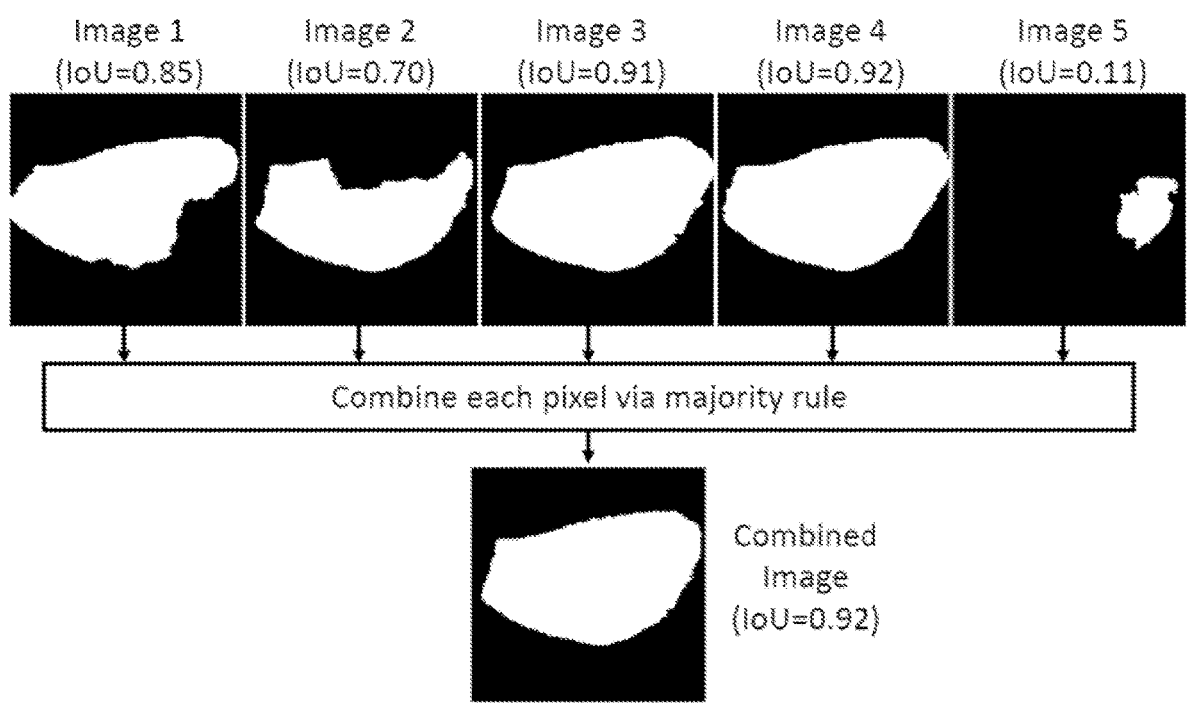
FIG. 6 depicts a conceptual data flow of combining segments.

FIG. 6 depicts a conceptual data flow of combining segments. Combining module 120 may receive a plurality of segments (Image 1 to 5 in FIG. 6) generated by the plurality of extracting models 115a to 115e. In some examples, combining module 120 may determine a value of each pixel in the combined segment based on values of corresponding pixels in the plurality of segments via majority rule (e.g., utilizing a median or mode value of pixels of the plurality of segments). As depicted in FIG. 6, combining module 120 may determine a pixel value of the combined segment $P_s$(x, y) to be 1 where at least three pixel values of corresponding pixels (x, y) among pixel value $P_{s1}$(x, y) of Image 1 to pixel value $P_{s5}$(x, y) of Image 5 are 1. By using majority rule for each pixel, pixels may be included in the target area even when some of the plurality extracting models 115 excluded (e.g., incorrectly excluded in such a way that the excluded pixels are relatively poorer at indicating the actual physical object of the pixels) such pixels from the target area.

In other examples, combining module 120 may utilize a different threshold number of pixel values. For example, combining module 120 may determine the pixel value $P_s$(x, y) to be 1 if at least two (or one) pixel values among pixel values $P_{s1}(x, y)$ to $P_{s5}(x, y)$ are 1. In another example, combining module 120 may determine the pixel value $P_s(x, y)$ to be 1 if at least four (or five) pixel values among pixel value $P_{s1}(x, y)$ to pixel value $P_{s5}(x, y)$ are 1. This threshold may be preset (e.g., predetermined and saved in a memory for use of combining module 120) differently based on the application of system 100. For example, the predetermined threshold may be preset to be greater where it is required to safely cover the target area widely, or the predetermined threshold may be preset to be smaller where irrelevant area must be absolutely ignored.

In other examples, combining module 120 may determine a value of each pixel in the combined segment based on an average of values of corresponding pixels in the plurality of segments. For example, combining module 120 may determine pixel value $P_s(x, y)$ as an average of pixel values $P_{s1}(x, y)$ to $P_{s5}(x, y)$. In such examples, combining module 120 may determine each pixel value $P_{s1}(x, y)$ to $P_{s5}(x, y)$ of the segments as influenced by the pixel value $P_s(x, y)$ of the combined segment to a certain degree. In other examples, combining module 120 may determine pixel value $P_s(x, y)$ to be a predetermined value (e.g., a pixel value of 1) if the average pixel value is larger than a threshold and otherwise different predetermined value (e.g., a pixel value of 0). In another example, combining module 120 may determine pixel value $P_s(x, y)$ based on the maximum value or the minimum value of pixel values $P_{s1}(x, y)$ to $P_{s5}(x,y)$.

As depicted in FIG. 6, the accuracies of the segments may be represented by Intersection over Union (IoU). IoU of Image 1 may be an area size of intersection and/or overlap of Image 1 and corresponding training segment divided by an area size of union of Image 1 and the corresponding training segment. IoUs of Images 2 to 5 are calculated in the similar manner. As shown in the example of FIG. 6, some segments (e.g. Image 2 and 5) have low accuracies. Nevertheless, IoU of the combined segment with respect to the corresponding training segment is equal to or higher than IoUs of any segments generated by the plurality of extracting model 115. This example shows that the system 100 may obtain an accurate combined segment even if some of the segments are not accurate.

Figure 7:
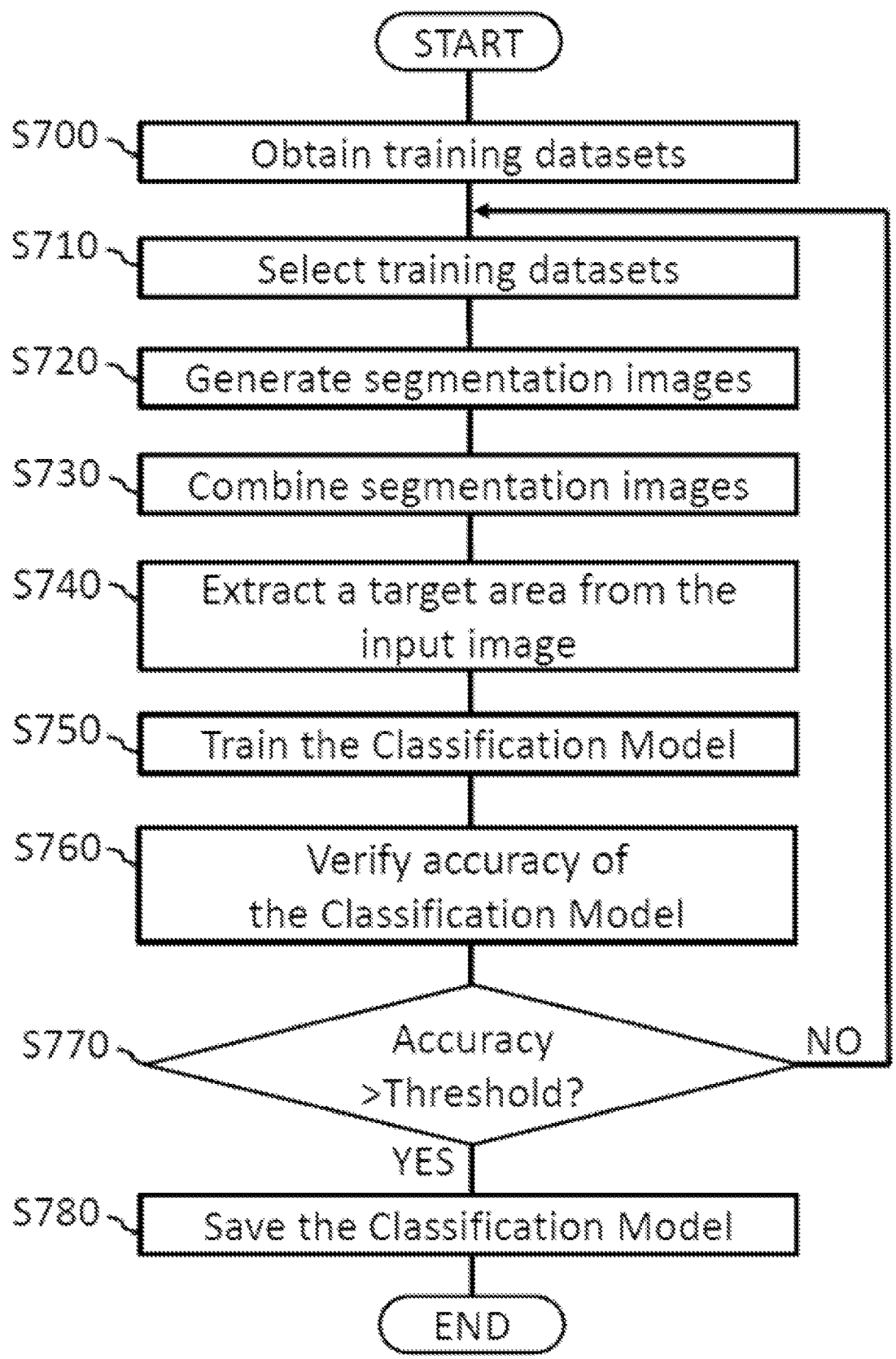
FIG. 7 depicts a flowchart of an example method of training a classification model.

FIG. 7 depicts a flowchart of an example method of training a classification model. This method may be performed by, for example, system 100 and its components that were explained in reference to FIG. 1. While this method is discussed below in reference to system 100 and its components, the operational flow may be performed by other systems having different components in other examples. Further, in some examples system 100 may execute other methods of training a classification model that are consistent with this disclosure (e.g., including additional steps or less steps or similar steps in a different order). The method of FIG. 7 may train the classification model in classifying module 140.

Classification training module 170 may obtain training datasets for training the classification model (S700). In some examples, each obtained training dataset for training the classification model may include a training input image and a training classification result. In certain examples, each training classification result may be created or otherwise reviewed by a professional and/or expert in the field (e.g., a veterinarian where the input image is an x-ray of an animal) who may diagnose the training input image.

Classification training module 170 may select training datasets for training and validating from the obtained plurality of training datasets (S710). In some examples, classification training module 170 may adopt a cross-validation method that uses some training datasets for training the classification model and uses other training datasets for validating the classification model. Once selected, classification training module 170 may transfer the selected training input images of the training datasets to generating module 110 (S720). Generating module 110 may generate a plurality of training segments for each training input image using the plurality of extracting models 115. For example, generating module 110 may generate training segments in a similar manner as described above in regards to S510 of FIG. 5. Combining module 120 may compare the plurality of training segments to obtain a training combined segment for each training image (S730). For example, combining module 120 may compare the plurality of training segments to obtain a training combined segment in a similar manner as described above in regards to S520 of FIG. 5. Extracting module 130 may extract a target area from each training input image using the training combined segment, therein obtaining a training extracted input image (S740). For example, extracting module 120 may extract a target area in a similar manner as described above in regards to S530 of FIG. 5.

Classification training module 170 may train the classification model in classifying module 140 using each training extracted input image as an input to the classification model and using the training classification result for each training extracted input image as a target output of the classification model (S750). The classification model is a machine learning model that may convert an image (i.e. the extracted input image) into a classification result. In this embodiment, the classification model is, or includes, a neural network such as a convolutional neural network (CNN). Classification training module 170 may update weight and bias parameters of the neural network using the selected training datasets with a training method such as backpropagation.

Classification training module 170 may verify the accuracy of the classification model (S760). For example, classification training module 170 may input each training input image into one or more respective training datasets for validating the classification model and therein obtain each classification result from the classification model. Once classification results are obtained, classification training module 170 may compare each classification result with a corresponding training classification result as included in respective training dataset in order to validate classification model. Classification training module 170 may calculate the accuracy as described herein based on the comparison results relating to each training dataset for validating.

Classification training module 170 may evaluate whether an accuracy of this validation satisfies a threshold (S770). Where classification training module 170 determines that this accuracy does not satisfy this threshold, then classification training module 170 may repeat this classification model training cycle (e.g., steps S710 through S760 of FIG. 7) to further train the classification model. If the accuracy satisfies the threshold, then classification training module 170 may determine that the classification model is sufficiently trained and save the parameters of the classification model in memory or storage (S780). In other examples, classification training module 170 may repeat the classification model training cycle until an improvement or an increase in accuracy is obtained. By repeatedly executing the classification model training cycle, the classification model may be trained to generate accurate classification results for input images. In this way, the classification model may be trained using the combined segment which, as described herein, may have an increased likelihood of being accurate as compared to non-combined segments in most cases. As such, system 100 may improve the accuracy of classifying input images.

Figure 8:
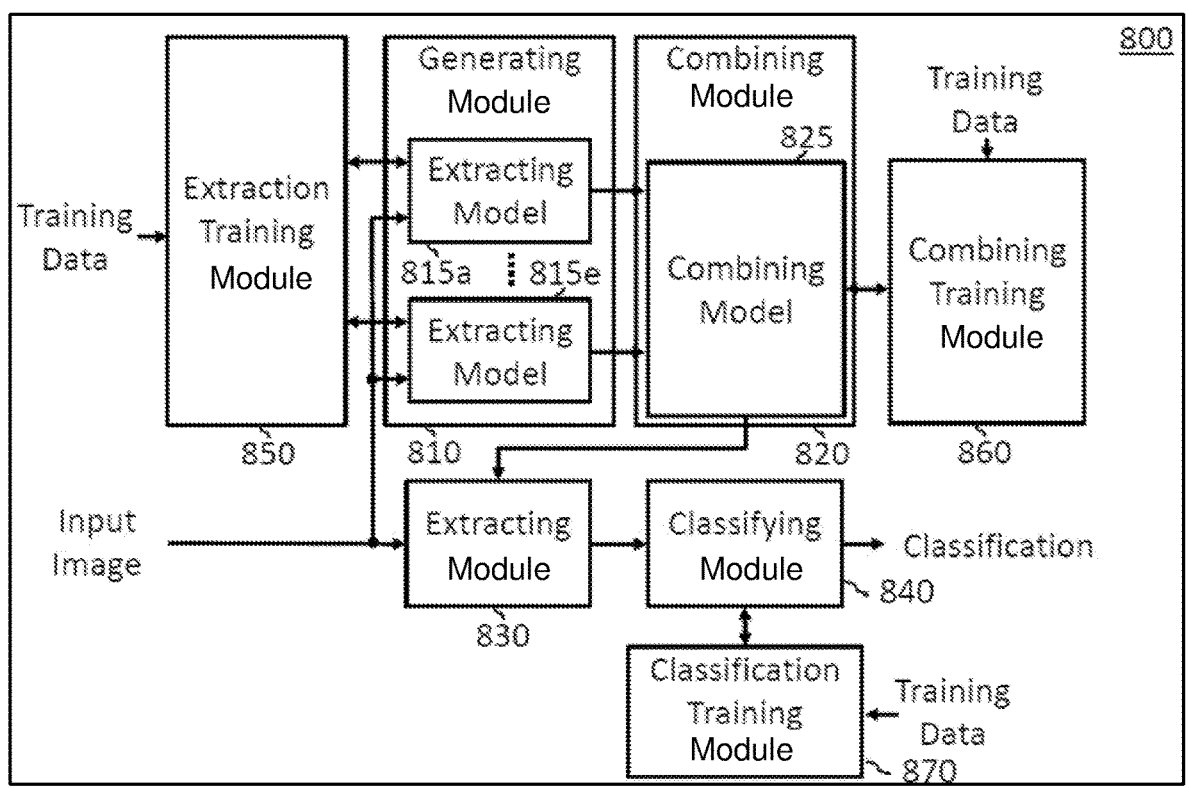
FIG. 8 depicts a conceptual and schematic illustration of an example system configured to manage a plurality of segments using a combining model.

FIG. 8 depicts a conceptual and schematic illustration of an example system 800. System 800 is an alternative of system 100. System 800 may be substantially similar to system 100 with the exception of any differences described herein. For example, system 800 may utilize a combining model in combining module 820. System 800 may further include combining training module 860, which may be configured to train combining model 825.

As depicted in FIG. 8, system 800 includes generating module 810, combining module 820, extracting module 830, classifying module 840, extraction training module 850, combining training module 860, and classification training section 870. Generating module 810, extracting model 815 in generating module 810, combining module 820, extracting module 830, classifying module 840, extraction training module 850, and classification training section 870 may be substantially similar with the exception of any differences described herein to generating module 110, extracting model 115 in generating module 110, combining module 820, extracting module 130, classifying module 140, extracting training module 150, and classification training module 170, respectively. The explanations in reference to FIGS. 1 to 7 with respect to these components and their operations may be substantially applicable to corresponding components in FIG. 8.

Combining module 820 may be configured to generate the combined segment using combining model 825. Combining model 825 may receive and process the plurality of segments in order to output the combined segment as described herein. Combining training module 860 may be configured to receive or otherwise access one or more training datasets for training combining model 825. In some examples, each training dataset that is received or access by combining training module 860 may include a training input image and a training combined segment. In some examples, combining training module 860 may be configured to train combining model 825 without the direct use of the training input image (e.g., such that the combining training module 860 does not execute with combining module 820 and the training input image simultaneously or concurrently). Instead, combining training module 860 may be configured to send the training input image to generating module 810, in response to which combining training module may obtain the plurality of training segments from generating module 810. Combining training module 860 may be configured to train combining model 825 based on at least one training dataset, where each training dataset includes both the plurality of training segments received from generating module 810 and the training combined segment.

Figure 9:
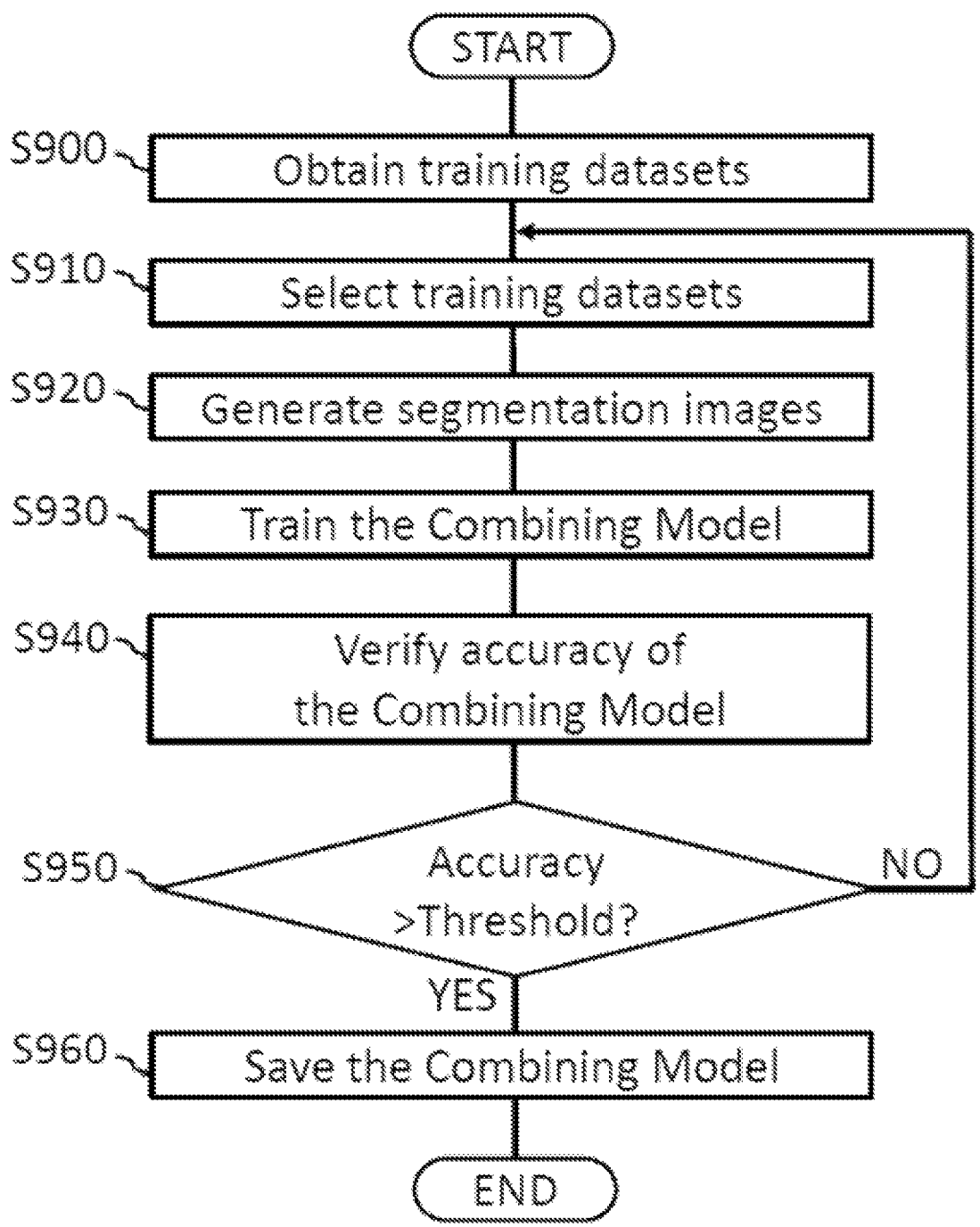
FIG. 9 depicts a flowchart of an example method of training a combining model.

FIG. 9 depicts a flowchart of an example method of training a combining model. This method may be executed by, for example, system 800 and its components that were explained in reference to FIG. 8. While the method of this figure are discussed in reference to system 800 and its components, the operational flow may be performed by other apparatus having different components as well. Further, in some examples system 800 may execute other methods of training a combining model that are consistent with this disclosure (e.g., including additional steps or less steps or similar steps in a different order).

Combining training module 860 may obtain training datasets for training combining model 825 (S900). In some examples, each of the received training dataset may include a training input image and a training combined segment. In some examples the training combined segment may be created by a professional who may diagnose the training input image. Combining training module 860 may train extracting models 815 and combining model 825 to output a segment that exactly distinguishes a target area from irrelevant areas. Therefore, the training datasets received by extraction training module 850 may also be used for training combining model 825. In some examples, a training segment may be used as a training combined segment.

Combining training module 860 may select training datasets for training and validating from the obtained plurality of training datasets (S910). In some examples, combining training module 860 may adopt a cross-validation method that uses some training datasets for training combining model 825 and uses other training datasets for validating combining model 825. Combining training module 860 may transfer training input images of the selected training datasets to generating module 810 (S920). Generating module 810 may be configured to generate, using the plurality of extracting models 815, a plurality of training segments for extracting a target area in each training input image. Generating module 810 may generate the plurality of training segments similar to described above with reference to S510 of FIG. 5 and S720 of FIG. 7.

Combining training module 860 may train combining model 825 using each training input image as an input to combining model 825 using the training combined segment as a target output of combining model 825 (S930). In some examples, combining model 825 may be a machine learning model that converts a plurality of images such as the plurality of segments to an image such as the combined segment. In such examples, combining model 825 may be or otherwise include a neural network such as a convolutional neural network (CNN). Combining training module 860 may be configured to update one or more weight and bias parameters of the neural network using the training datasets selected (e.g., selected in S910) with a training method such as backpropagation.

Combining training module 860 may be configured to verify the accuracy of combining model 825 (S940). For example, combining training module 860 may send each training input image in the training datasets for validation to generating module 810. Once received, generating module 810 may generate the plurality of training segments and output them as combining model 825 in combining module 820. Combining training module 860 may then obtain this outputted combined segment from combining module 820 and compare each combined segment with a corresponding training combining segment in each respective training dataset in order to validate combining model 825. Combining training module 860 may calculate an accuracy similar to such accuracy calculations described herein.

Combining training module 860 may determine whether or not this accuracy satisfies a threshold (S950). Where combining training module 860 determines that the accuracy does not satisfy the threshold, combining training module 860 may repeat this combining model training cycle (e.g., steps S910 to S950 of FIG. 9) again to further train combining model 825. Where combining training module 860 determines that the accuracy does satisfy the threshold, then combining training module 860 may saves the parameters of combining model 825 in memory or storage (S960). In other examples, combining training module 860 may repeats the combining model training cycle until an improvement or an increase in accuracy is obtained. By repeatedly executing the combining model training cycle, combining model 825 may be trained to generate accurate combined segments for input images.

In some examples, combining module 820 may use trained combining model 825 to compare the plurality of segments from generating module 810. By using a machine learning model such as combining model 825, combining module 820 may be configured to perform a complex calculation in combining the plurality of segments. As such, system 800 may be configured to improve the accuracy of the combined segment at accurately depicting the shape of the depicted object.

Figure 10:
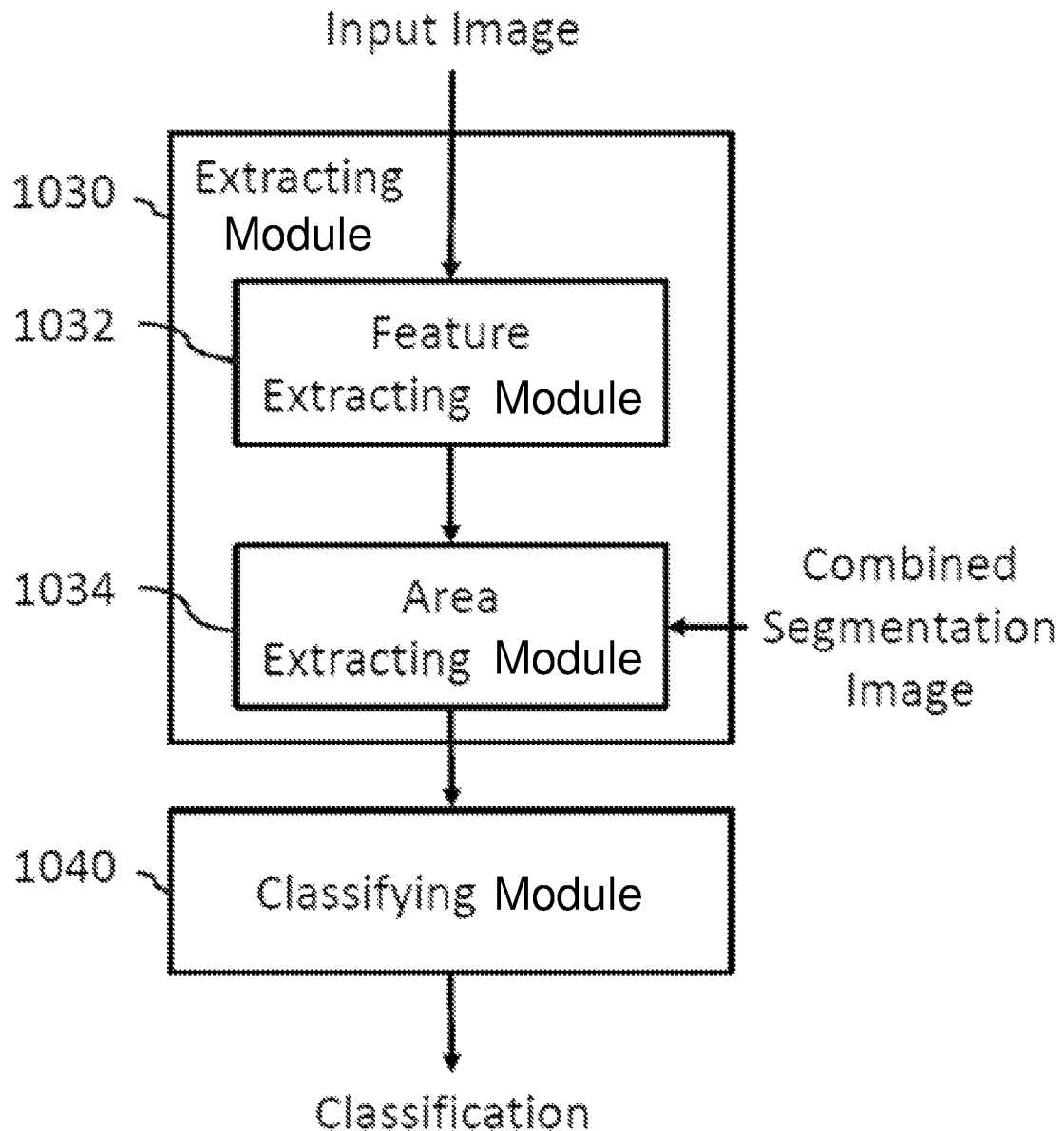
FIG. 10 depicts a conceptual and schematic illustration of an example system including an extraction module and a classifying module that may be configured to extract a target area and classify the image based on the extracted target area, respectively.

FIG. 10 depicts a conceptual and schematic illustration of an example system including extraction module 1030 and classifying module 1040. Extraction module 1030 and classifying module 1040 substantially similar to extracting modules 130, 830 and classifying module 140, 840, of FIGS. 1 and 8, respectively, with the exception of any differences described herein. Extraction module 1030 may be configured to receive or otherwise access the input image and the combined segment and then extract a target area from the input image using the combined segment. Extraction module 1030 may be configured to extract features of the input image and obtain an image feature map of the target area. Extraction module 1030 includes feature extracting module 1032 and area extracting module 1034.

Feature extracting module 1032 may be configured to use the input image to extract one or more image feature maps of the input image as described below. Once extracted, feature extracting module may output (e.g., store in a communal memory store, or transmit to another module) the one or more image feature maps of the input image. Feature extracting module 1032 may include a feature extracting model to extract features. The feature extracting model may include a machine learning model that is configured to convert an input image to one or more image feature maps.

In some examples, the feature extracting model is or otherwise includes a neural network such as a CNN. This neural network may include at least one image feature extracting layer. The image feature map may include an array of features (x, y) (x=0, 1, . . . , $SIZE_x-1$ and y=0, 1, . . . , $SIZE_y-1$), where each of these features represent characteristics of a corresponding area or sub-image of the input image. Image feature extracting layers of the neural network may receive the input image or an input image feature map that include an array structure (e.g., a two-dimensional array structure) from the preceding layer. Once the image feature extracting layers receive this input image, the layers may generate an output image feature map that includes an array structure based on the input image or the input image feature map from the preceding layer. In this way, each image feature extracting layer may generate an output image feature map to the succeeding layer. As described herein, image feature extracting layers may include at least one of a convolution layer or a max pooling layer. Image feature extracting layers may also include any other layer (e.g. up-sampling layer, down-sampling layer, and concatenation layer) that outputs an array of features (x, y).

Area extracting module 1034 may be configured to extract a target area from the input image by extracting the target area of one or more image feature maps based on a generated combined segment. Area extracting module 1034 may be substantially similar to extracting modules 130, 830 of FIGS. 1 and 8, respectively, with the exception of any differences described herein. For example, area extracting module 1034 may be configured to receive and process one or more image feature maps instead of the input image itself.

With these image feature maps, area extracting module 1034 may generate one or more extracted image feature maps as the extracted input image.

Classifying module 1040 may be configured to receive the extracted input image from area extracting module 1034 and therein classify or identify the input image based on the target area extracted from the input image. In some examples, classifying module 1040 may include a classification model that classifies the input image based on one or more extracted image feature maps. In certain examples, the classification model may be or includes a neural network as described herein. This neural network may include one or more classification layers, where each classification layer may be a full-connection layer. In certain examples, at least one neuron of the last layer in the neural network may be configured to generate a probability or a certainty of the presence or the absence of a predetermined object in the input image. In this way, the neural network may generate a probability or a certainty of the presence or the absence of a condition of the input image, such as, e.g., a predetermined disease of an organ where the input image is an X-ray image of the organ.

In some examples, classifying module 1040 may be configured to train neural networks of a feature extracting model and/or train a classification model as described at S750 in FIG. 7 or at S930 in FIG. 9. For example, classifying module 1040 may train neural networks of the feature extracting model and the classification model with backpropagation. During backpropagation, a classification training module of the classifying module 1040 may be configured to apply the combined segment to any identified errors that were back-propagated from the neural network (e.g., similar to the same manner in which area extracting module 1034 extracts the target area of the image feature maps). For example, a classification training module may be configured to mask identified errors using the combined segment, or classification training module may be configured to multiply the combined segment with the identified errors. Then, the classification training module may propagate the errors to the last layer of the neural network of the feature extracting model in order to train the neural network of the feature extracting model with a backpropagation.

In such examples, a combined segment may be used after feature extracting module 1032 extracts image feature maps from an input image. The image feature extraction of feature extracting module 1032 may not be modified or otherwise influenced by the combined segment especially near the border of the target area. Therefore, the accuracy of the image classification of classifying module 1040 may be improved.

Various embodiments of the present disclosure may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Figure 11:
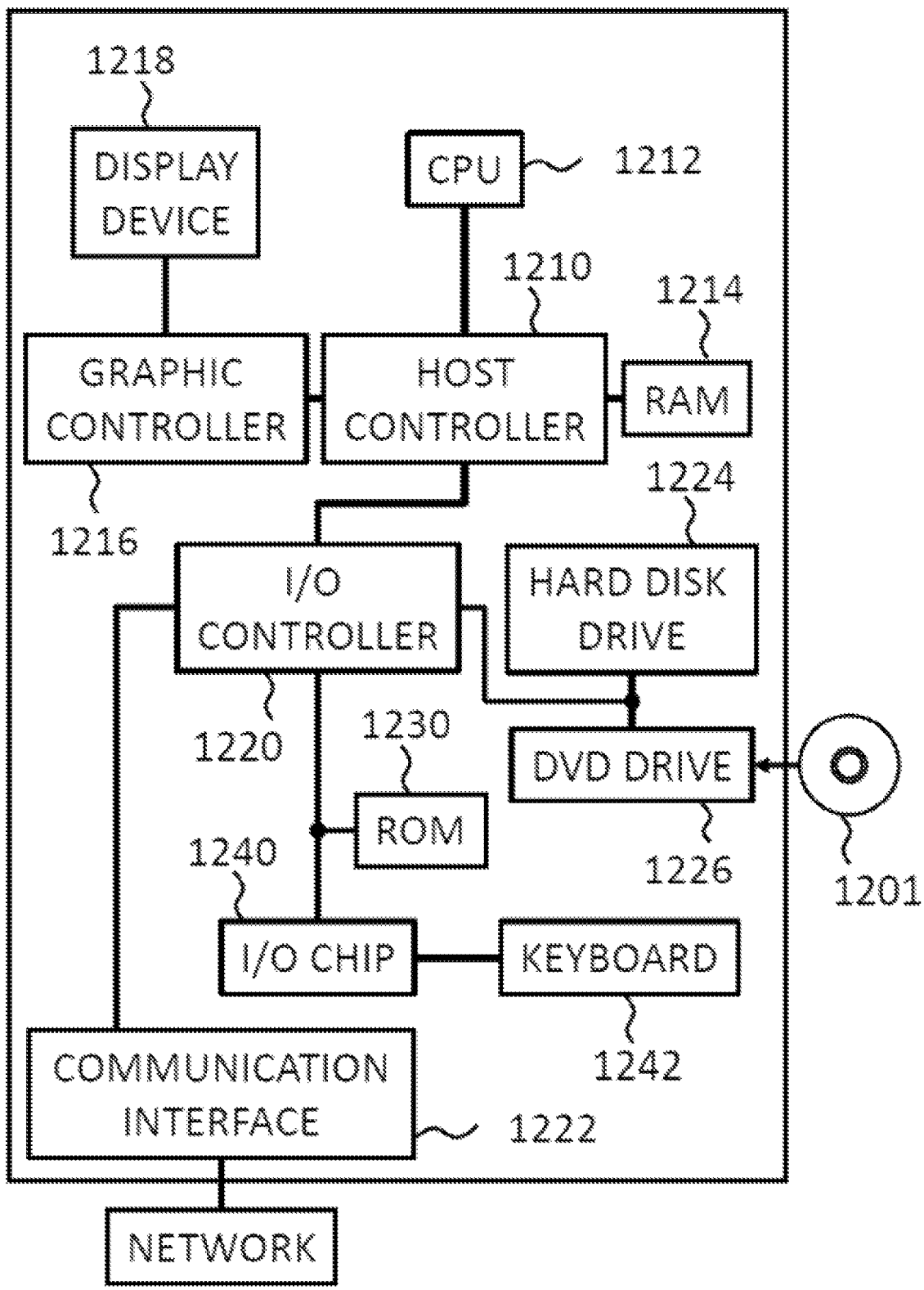
FIG. 11 depicts a conceptual and schematic illustration of an example computer that may be configured to execute aspects of this disclosure.

FIG. 11 shows an example of a computer 1200 in which aspects of the present disclosure may be wholly or partly embodied. For example, a program that is installed in the computer 1200 may cause the computer 1200 to function as or perform operations associated with systems of the embodiments of the present disclosure or one or more modules thereof, and/or cause the computer 1200 to perform processes of the embodiments of the present disclosure or steps thereof. Such a program may be executed by the CPU 1212 to cause the computer 1200 to perform certain operations associated with some or all of the blocks of flowcharts and block diagrams described herein.

The computer 1200 as depicted includes a CPU 1212, a RAM 1214, a graphics controller 1216, and a display device 1218, which are depicted as being mutually connected by a host controller 1210. The computer 1200 may also include input/output units such as a communication interface 1222, a hard disk drive 1224, a DVD-ROM drive 1226 and an IC card drive, which are connected to the host controller 1210 via an input/output controller 1220. In some examples the computer 1200 may include legacy input/output units such as a ROM 1230 and a keyboard 1242, which may be connected to the input/output controller 1220 through an input/output chip 1240.

The CPU 1212 may operate according to programs stored in the ROM 1230 and the RAM 1214, thereby controlling each unit. The graphics controller 1216 may be configured to obtain image data generated by the CPU 1212 on a frame buffer or the like provided in the RAM 1214 or in itself, and therein causes the image data to be displayed on the display device 1218. The communication interface 1222 may communicate with other electronic devices via a network. The hard disk drive 1224 may store programs and data used by the CPU 1212 within the computer 1200. The DVD-ROM drive 1226 may read the programs or the data from the DVD-ROM 1201 and therein provide the hard disk drive 1224 with the programs or the data via the RAM 1214. The IC card drive may read programs and data from an IC card, and/or writes programs and data into the IC card.

The ROM 1230 may store a boot program or the like executed by the computer 1200 at the time of activation and/or a program depending on the hardware of the computer 1200. The input/output chip 1240 may also connect various input/output units via a parallel port, a serial port, a keyboard port, a mouse port, and the like to the input/output controller 1220. In some examples a program is provided by computer readable media such as the DVD-ROM 1201 or the IC card. The program may be read from the computer readable media, installed into the hard disk drive 1224, RAM 1214, or ROM 1230, which are other examples of computer readable media. The program instructions may be executed by the CPU 1212. The information processing described in these programs may be read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, may read transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet may be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements may be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams may be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
    receiving an input image that includes a target area;
    generating, using two different extracting models, two different segments for extracting the same target area from the input image;
    comparing the two different segments to determine a combined segment of at least the target area.

2. The computer-implemented method of claim 1, further comprising:
    extracting the target area from the input image using the combined segment; and classifying the input image based on the target area extracted from the input image.

3. The computer-implemented method of claim 1, wherein the two different extracting models include a first and second extracting model and the two different segments include a first and second segment, further comprising generating, using a third extracting model, a third segment for extracting the target area from the input image, wherein:
the comparing the two different segments includes comparing respective pixels of the first segment to respective pixels of the second segment to respective pixels of the third segment to determine a value of each pixel in the combined segment based on majority rule.

4. The computer-implemented method of claim 1, wherein the comparing the two different segments includes determining a value of each pixel in the combined segment based on an average of values of corresponding pixels in the two different segments.

5. The computer-implemented method of claim 1, wherein the comparing includes generating the combined segment using a combining model, and the combining model inputs the two different segments to generate the combined segment.

6. The computer-implemented method of claim 5, further comprising training the combining model based on at least one training dataset, wherein the training dataset includes a plurality of training segments and a training combined segment.

7. The computer-implemented method of claim 6, wherein the generating the plurality of segments includes generating, using the two different extracting models, the plurality of training segments for extracting a target area in a training input image.

8. The computer-implemented method of claim 5, wherein the combining model includes a neural network.

9. The computer-implemented method of claim 1, further comprising training the two different extracting models based on training datasets, wherein each training dataset includes a training input image and a training segment.

10. The computer-implemented method of claim 9, wherein the training the two different extracting models includes training each extracting model using a K-fold cross-validation method.

11. The computer-implemented method of claim 10, wherein the training the two different extracting models includes:
dividing the training datasets into a plurality of subsets, and
assigning, for each extracting model, a different combination of subsets from the plurality of subsets for training and validating each extracting model.

12. The computer-implemented method of claim 9, wherein the training the two different extracting models includes:
training a first extracting model of the two different extracting models; and
training a second extracting model of the two different extracting models, wherein the second extracting model is further trained from the first extracting model.

13. A computer program product including one or more computer readable storage mediums collectively storing program instructions that, when executed by a processor or programmable circuitry, cause the processor or programmable circuitry to perform operations comprising:
generating, using a first extracting model, a first segment for extracting a target area from an input image;
generating, using a second extracting model that is different than the first extracting model, a second segment for extracting the target area from the input image; and
comparing the first segment to the second segment to determine a combined segment of at least the target area.

14. The computer program product of claim 13, further comprising instructions that, when executed by the processor or programmable circuitry, cause the processor or programmable circuitry to perform operations comprising generating, using a third extracting model, a third segment for extracting the target area from the input image, wherein:
the comparing the first segment to the second segment includes comparing respective pixels of the first segment to respective pixels of the second segment to respective pixels of the third segment to determine a value of each pixel in the combined segment based on majority rule.

15. The computer program product of claim 13, wherein the comparing includes generating the combined segment using a combining model, and the combining model inputs the first segment and the second segment to generate the combined segment.

16. The computer program product of claim 15, further comprising instructions that, when executed by the processor or programmable circuitry, cause the processor or programmable circuitry to perform operations comprising training the combining model based on at least one training dataset, wherein each training dataset includes a plurality of training segments and a training combined segment.

17. The computer program product of claim 13, wherein the combining model includes a neural network.

18. The computer program product of claim 13, further comprising instructions that, when executed by the processor or programmable circuitry, cause the processor or programmable circuitry to perform operations comprising training the first and second extracting models based on training datasets, wherein each training dataset includes a training input image and a training segment.

19. The computer program product of claim 18, wherein the training the first and second extracting models includes training each extracting model using a K-fold cross-validation method.

20. An apparatus comprising:
a processor or a programmable circuitry; and
one or more computer readable mediums collectively including instructions that, when executed by the processor or the programmable circuitry, cause the processor or the programmable circuitry to:
generate, using a first extracting model, a first segment for extracting a target area from an input image;
generate, using a second extracting model that is different than the first extracting model, a second segment for extracting the target area from the input image; and
compare the first segment to the second segment to determine a combined segment of at least the target area.

21. The apparatus of claim 20, further comprising instructions that, when executed by the processor or programmable circuitry, cause the processor or programmable circuitry to generate, using a third extracting model, a third segment for extracting the target area from the input image, wherein:
the comparing the first segment to the second segment includes comparing respective pixels of the first segment to respective pixels of the second segment to respective pixels of the third segment to determine a value of each pixel in the combined segment based on majority rule.

22. The apparatus of claim 20, wherein the comparing includes generating the combined segment using a combining model, and the combining model inputs the first segment and the second segment to generate the combined segment.

23. The apparatus of claim 22, further comprising instructions that, when executed by the processor or programmable circuitry, cause the processor or programmable circuitry to train the combining model based on at least one training dataset, wherein each training dataset includes a plurality of training segments and a training combined segment.

24. The apparatus of claim 20, further comprising instructions that, when executed by the processor or programmable circuitry, cause the processor or programmable circuitry to train the first and second extracting models based on training datasets, wherein each training dataset includes a training input image and a training segment.

25. The apparatus of claim 24, wherein the training the first and second extracting models includes training each extracting model using a K-fold cross-validation method.

* * * * *